US009402480B2

(12) United States Patent
Holzhueter

(10) Patent No.: US 9,402,480 B2
(45) Date of Patent: Aug. 2, 2016

(54) ADJUSTABLE SEAT ASSEMBLY

(71) Applicant: Walter W Holzhueter, Southgate, MI (US)

(72) Inventor: Walter W Holzhueter, Southgate, MI (US)

(73) Assignee: FCA US LLC, Auburn Hills, MI (US)

( * ) Notice: Subject to any disclaimer, the term of this patent is extended or adjusted under 35 U.S.C. 154(b) by 154 days.

(21) Appl. No.: 13/688,279

(22) Filed: Nov. 29, 2012

(65) Prior Publication Data

US 2014/0145482 A1  May 29, 2014

(51) Int. Cl.
*B60N 2/62* (2006.01)
*A47C 3/00* (2006.01)
*B60N 2/18* (2006.01)
*B64D 11/06* (2006.01)
*A47C 1/023* (2006.01)

(52) U.S. Cl.
CPC .............. *A47C 3/00* (2013.01); *B60N 2/1803* (2013.01); *B60N 2/1842* (2013.01); *A47C 1/023* (2013.01); *B60N 2/62* (2013.01); *B64D 11/06* (2013.01)

(58) Field of Classification Search
CPC ........ B60N 2/62; B60N 2/1839; B60N 2/284; A47C 1/023; B64D 11/06
USPC ........... 297/313, 284.11, 321, 344.15, 344.17
See application file for complete search history.

(56) References Cited

U.S. PATENT DOCUMENTS

| | | | |
|---|---|---|---|
| 3,068,047 A * | 12/1962 | Schliephacke | A47C 1/0347 297/329 |
| 4,636,002 A * | 1/1987 | Genjiro | 297/319 |
| 4,693,513 A * | 9/1987 | Heath | B60N 2/1839 297/284.11 |
| 4,709,961 A * | 12/1987 | Hill | B60N 2/1839 297/284.11 |
| 4,775,185 A * | 10/1988 | Scholin et al. | 297/284.11 |
| 7,322,652 B1 | 1/2008 | Tache | |
| 7,850,247 B2 | 12/2010 | Stauske et al. | |
| 7,909,403 B2 | 3/2011 | Lawall et al. | |
| 8,128,147 B1* | 3/2012 | Kanda et al. | 296/65.05 |
| 8,128,167 B2 | 3/2012 | Zhong et al. | |
| 2007/0222270 A1 | 9/2007 | Combest | |
| 2010/0253110 A1* | 10/2010 | Yamada et al. | 296/65.08 |
| 2014/0339873 A1* | 11/2014 | Cerruti | B60N 2/1615 297/344.13 |

* cited by examiner

*Primary Examiner* — Syed A Islam
(74) *Attorney, Agent, or Firm* — Ralph E. Smith

(57) ABSTRACT

A seat assembly is provided that may include a seatback and a seat bottom. The seatback may extend generally upright. The seat bottom may be connected to the seatback and may include a frame and a seat bottom adjustment mechanism. The seat bottom adjustment mechanism may include first and second cushion pans that are movable relative to the frame and movable relative to each other between first and second configurations. The first and second cushion pans may support one or more seat cushions.

20 Claims, 3 Drawing Sheets

ADJUSTABLE SEAT ASSEMBLY

FIELD

The present disclosure relates to an adjustable seat assembly.

BACKGROUND

Modern vehicles typically include seat assemblies that are adjustable to facilitate occupant comfort. Such seat assemblies may be configured to allow the occupant to select a position of the seat assembly that improves the occupant's comfort and/or posture. For example, a particular position of the seat assembly may be chosen based on the occupant's size, body shape and/or whether the occupant will be driving or performing some other activity while sitting in the seat assembly.

SUMMARY

The present disclosure provides a seat assembly that may include a seatback and a seat bottom. The seatback may extend generally upright. The seat bottom may be connected to the seatback and may include a frame and a seat bottom adjustment mechanism. The seat bottom adjustment mechanism may include first and second cushion pans that are movable relative to the frame and movable relative to each other between first and second configurations. The first and second cushion pans may support one or more seat cushions.

In some embodiments, the first cushion pan may include an aft end that is pivotably connected to the frame and a forward end that is disposed at a first vertical distance from the frame in the first configuration and a second vertical distance from the frame in the second configuration. The second vertical distance may be greater than the first vertical distance. In some embodiments, the second vertical distance may be less than the first vertical distance.

In some embodiments, upward-facing edges of the first and second cushion pans may cooperate to define a first angle therebetween in the first configuration and a second angle therebetween in the second configuration.

In some embodiments, the first angle may be greater than one-hundred-eighty degrees, and the second angle may be less than one-hundred-eighty degrees. In some embodiments, the first angle may be less than one-hundred-eighty degrees, and the second angle may be greater than one-hundred-eighty degrees.

In some embodiments, the second cushion pan may be pivotably connected to the first cushion pan.

In some embodiments, the first cushion pan may correspond to a rear portion of the seat bottom that is adjacent the seatback. In some embodiments, the second cushion pan may correspond to a front portion of the seat bottom that is spaced apart from the seatback.

In some embodiments, the first and second cushion pans may simultaneously move relative to each other and relative to the frame.

In some embodiments, the seat bottom adjustment mechanism may include a first link pivotably mounted to the frame, a second link pivotably mounted to the first link and the first cushion pan, and a third link pivotably mounted to the first link and the second cushion pan.

In another form, the present disclosure provides a seat assembly that may include a seatback and a seat bottom. The seatback may extend generally upright. The seat bottom may be connected to the seatback and may include a frame and a seat bottom adjustment mechanism. The seat bottom adjustment mechanism may include a cushion pan assembly that is tiltable relative to the frame between first and second positions. The cushion pan assembly may include a first profile shape in the first position and a second profile shape in the second position.

In some embodiments, the cushion pan assembly may include first and second cushion pans that are movable relative to each other to form the first and second profile shapes.

In some embodiments, the first cushion pan includes an aft end that is pivotably connected to the frame and a forward end that is disposed at a first vertical distance from the frame in the first position and a second vertical distance from the frame in the second position. In some embodiments, the second vertical distance may be greater than the first vertical distance. In some embodiments, the second vertical distance may be less than the first vertical distance.

In some embodiments, upward-facing edges of the first and second cushion pans may cooperate to define a first angle therebetween in the first position and a second angle therebetween in the second position. In some embodiments, the first angle may be greater than one-hundred-eighty degrees, and the second angle may be less than one-hundred-eighty degrees. In some embodiments, the first angle may be less than one-hundred-eighty degrees, and the second angle may be greater than one-hundred-eighty degrees.

In some embodiments, the second cushion pan may be pivotably connected to the first cushion pan.

In some embodiments, the first cushion pan may correspond to a rear portion of the seat bottom that is adjacent the seatback. In some embodiments, the second cushion pan may correspond to a front portion of the seat bottom that is spaced apart from the seatback.

In some embodiments, the first and second cushion pans may simultaneously move relative to each other and relative to the frame.

In some embodiments, the seat bottom adjustment mechanism may include a first link pivotably mounted to the frame, a second link pivotably mounted to the first link and the first cushion pan, and a third link pivotably mounted to the first link and the second cushion pan.

In some embodiments, the cushion pan assembly may support one or more seat cushions.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
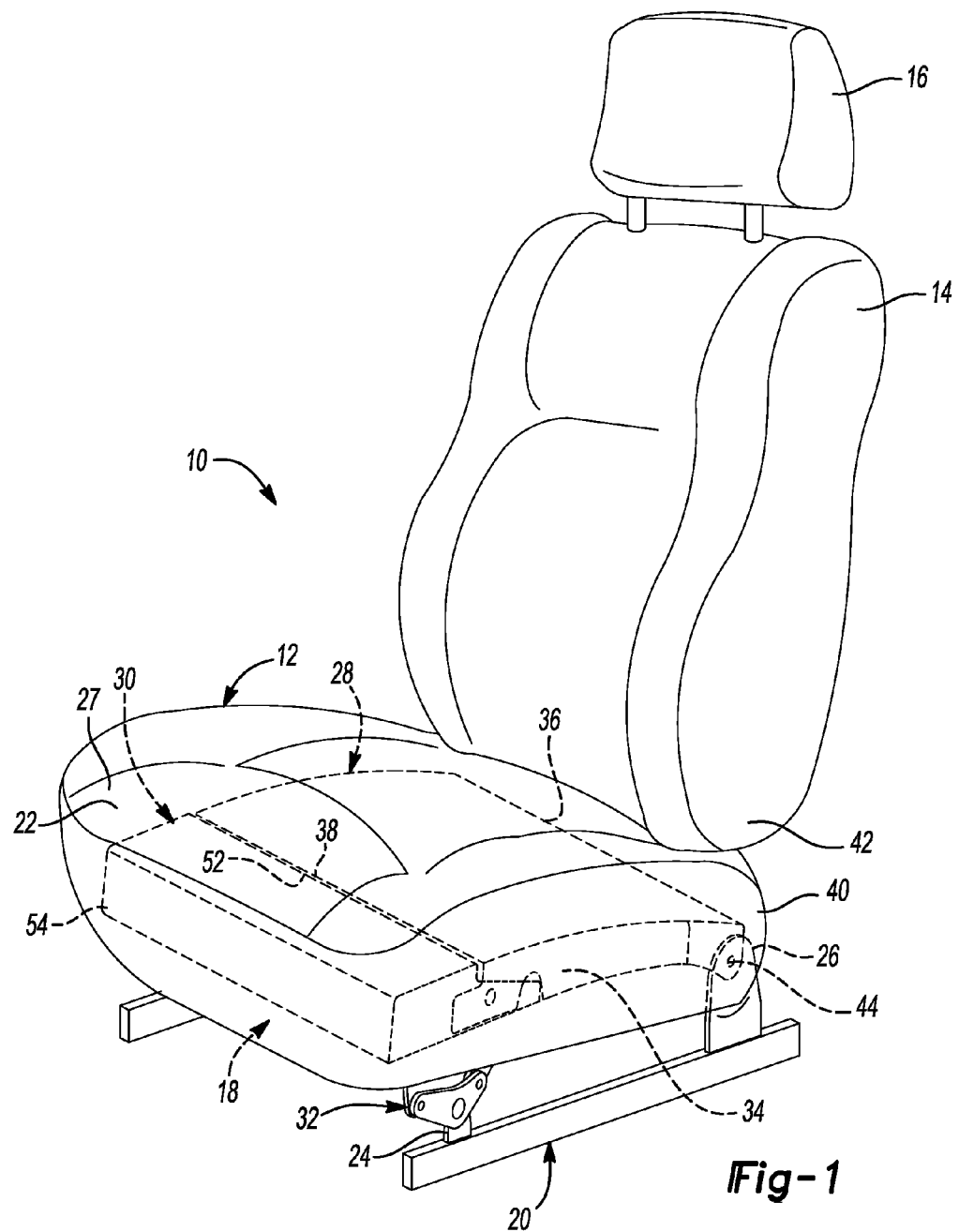
FIG. 1 is a perspective view of a seat assembly having a seat bottom adjustment mechanism according to the principles of the present disclosure.

In an exemplary embodiment and with reference to FIGS. 1-5, a seat 10 is provided that may include a seat bottom 12, a seatback 14, and a headrest 16. The seat 10 can be configured for installation in a vehicle (not shown) such as an automobile, an airplane, a train, or a boat, for example, or any other type of vehicle. It will be appreciated, however, that the principles of the present disclosure may be applicable to any type of seat or chair other than a vehicle seat. As will be subsequently described, the seat bottom 12 may include a seat bottom adjustment mechanism 18 that may be operable to adjust a position and profile shape of the seat bottom 12 to improve user comfort.

In addition to the seat bottom adjustment mechanism 18, the seat bottom 12 may include a frame 20 (shown schematically in the figures) and one or more seat cushions 22. The frame 20 may include a pair of front mounting structures 24 (only one of which is shown in the figures) and a pair of rear mounting structures 26 (only one of which is shown in the figures) supporting the seat bottom adjustment mechanism 18. It will be appreciated that the frame 20 could have any configuration suitable for supporting the seat bottom 12 and attaching the seat bottom 12 to a floor (not shown) of a vehicle in which the seat 10 may be installed. Some or all of the seat bottom 12 may be covered with an upholstery 27 (e.g., cloth, leather or vinyl upholstery).

The seat bottom adjustment mechanism 18 may support the seat cushion 22 and may include a rear cushion pan 28, a front cushion pan 30 and an adjustment linkage 32. The rear cushion pan 28 may include a body 34 having an aft end 36 and a forward end 38. The aft end 36 may be disposed at or proximate a rear portion 40 of the seat bottom 12 that is adjacent a lower end 42 of the seatback 14. The aft end 36 may be pivotably connected to the rear mounting structure 26 at a first pivot 44. One or more flanges or mounting brackets 46 (FIG. 5) may extend from the forward end 38 and may be connected to the adjustment linkage 32. An upward-facing surface 48 of the body 34 may extend between the aft and forward ends 36, 38 and may support the seat cushion 22.

The front cushion pan 30 may include a body 50 having an aft end 52, a forward end 54 and lateral sides 56. The aft end 52 may be disposed proximate the forward end 38 of the rear cushion pan 28. An upward-facing surface 58 of the body 50 may extend between the aft and forward ends 52, 54 and may cooperate with the upward-facing surface 48 of the rear cushion pan 28 to support the seat cushion 22. A pair of arms 60 may extend rearward from corresponding lateral sides 56 of the body 50. The arms 60 may be pivotably connected to the rear cushion pan 28 at a second pivot 62 to facilitate rotation of the front cushion pan 30 relative to the rear cushion pan 28. Distal ends 64 of the arms 60 may be pivotably connected to the adjustment linkage 32.

Figure 2:
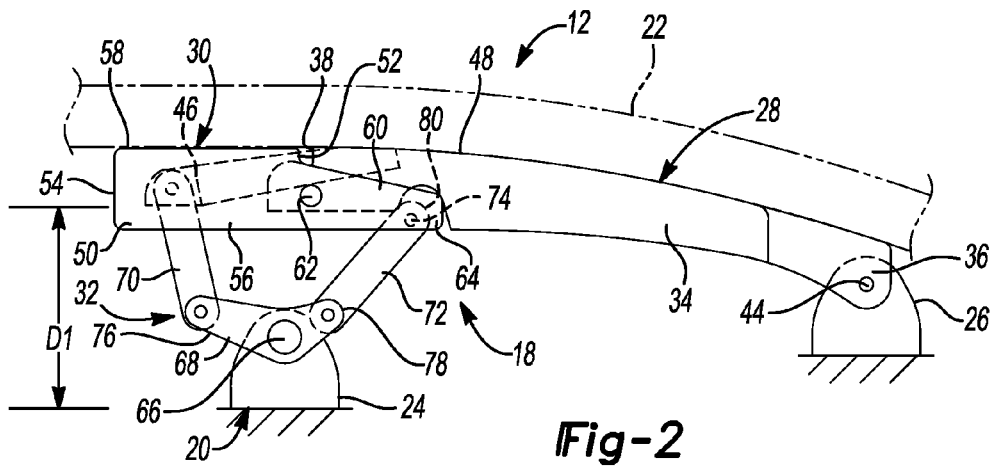
FIG. 2 is a side view of the seat bottom adjustment mechanism in a first position.
Figure 3:
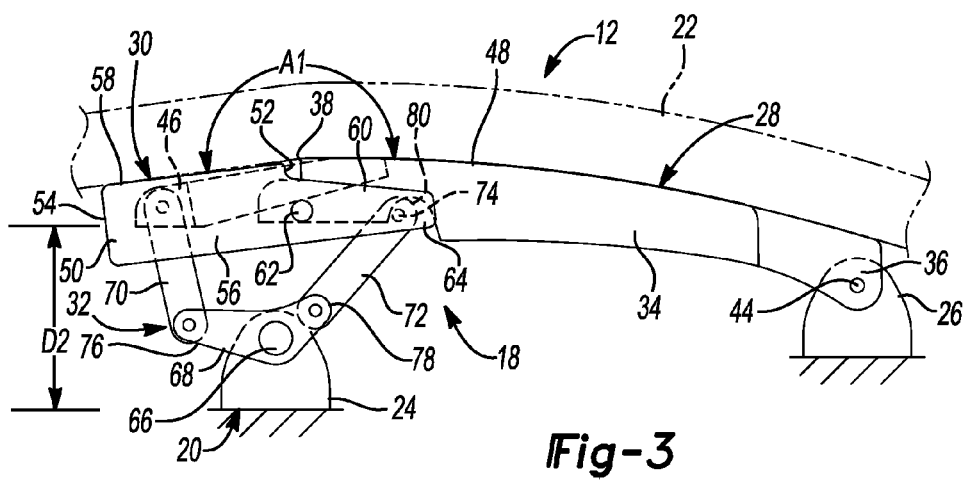
FIG. 3 is a side view of the seat bottom adjustment mechanism in second first position.
Figure 4:
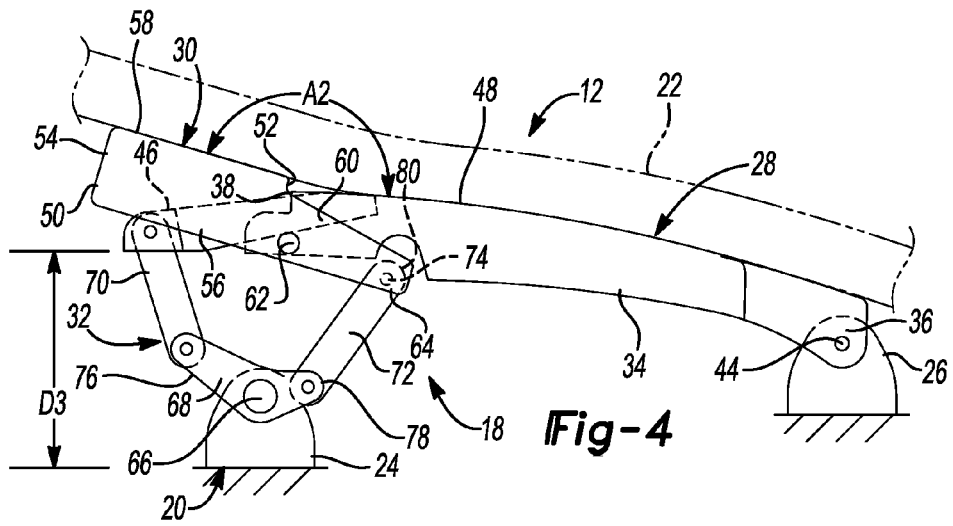
FIG. 4 is a side view of the seat bottom adjustment mechanism in a third position.
Figure 5:
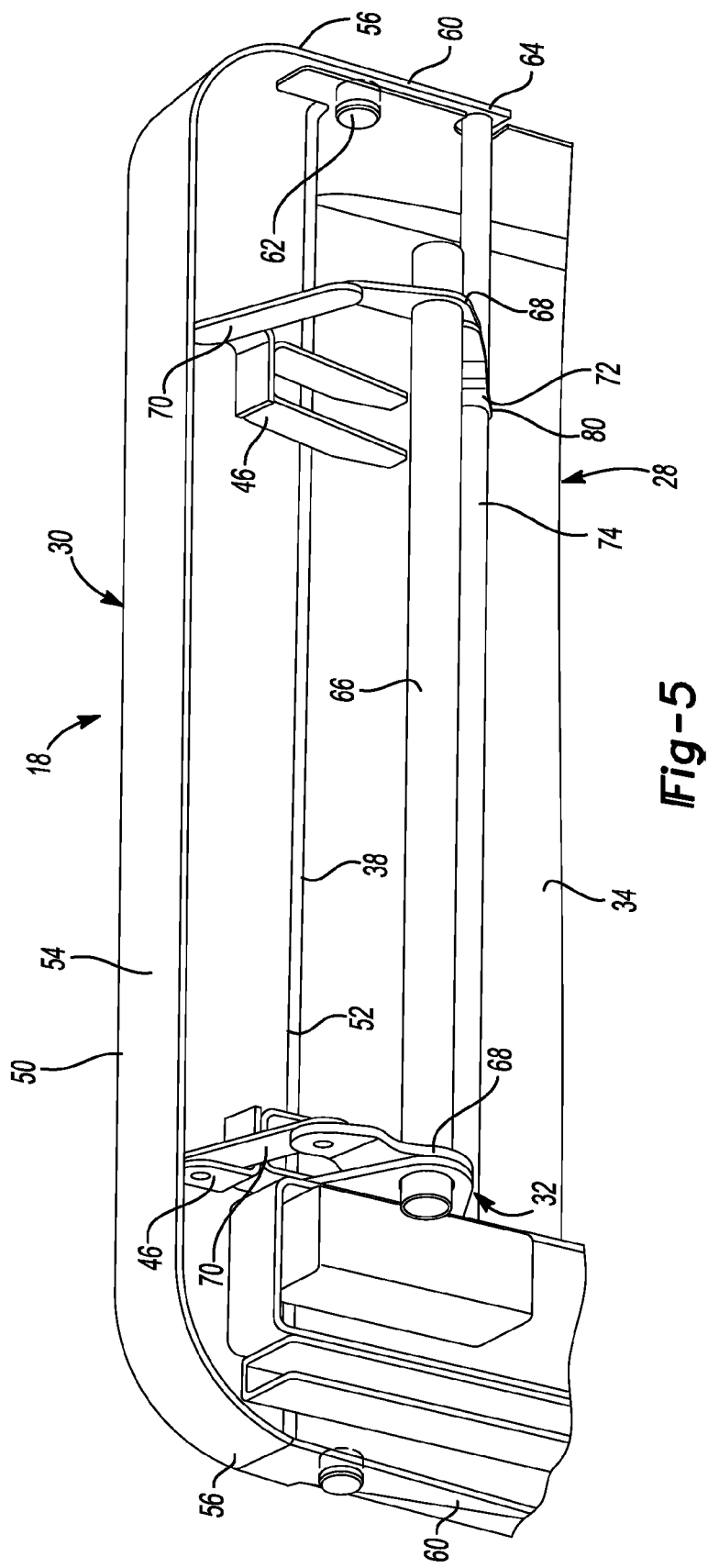
FIG. 5 is a bottom perspective view of the seat bottom adjustment mechanism.

As shown in FIGS. 2-5, the adjustment linkage 32 may include a drive axle 66, a pair of drive links 68, a pair of front links 70, a pair of rear links 72, and a connecting rod 74 (FIG. 5). The drive axle 66 may be rotatably supported by the front mounting structure 24 and may be fixedly connected to the drive links 68. While not specifically shown in the figures, a motor-driven or manually actuated output shaft may be drivingly connected to the drive axle 66 to cause rotation of the drive axle 66 and the drive links 68 relative to the front mounting structure 24 in response to a user actuating a switch or manually turning a lever, for example. Movement of the drive links 68 causes corresponding movement of the front and rear links 70, 72 among first, second and third positions, as shown in FIGS. 2-4.

Each of the front links 70 may be pivotably connected to a first end 76 of a corresponding one of the drive links 68 and may be pivotably connected to the mounting brackets 46 of the rear cushion pan 28. In this manner, movement of the front links 70 causes corresponding movement of the rear cushion pan 28.

Each of the rear links 72 may be pivotably connected to a second end 78 of a corresponding one of the drive links 68 and may be pivotably connected to a corresponding one of the arms 60 of the front cushion pan 30 via the connecting rod 74. That is, an end 80 of each rear link 72 may be coupled to the connecting rod 74, which is coupled to the arms 60 such that movement of the rear links 72 causes corresponding movement of the front cushion pan 30.

With continued reference to FIGS. 1-5, operation of the seat bottom adjustment mechanism 18 will be described in detail. As described above, the seat bottom adjustment mechanism 18 may be operable to adjust a position and profile shape of the seat bottom 12 to adjust support for a user's thighs and improve the user's comfort. The user may adjust the position and profile of the rear and front cushion pans 28, 30 to provide a desired amount of thigh support. The amount of thigh support that is comfortable for the user may be dependent upon the user's height, leg length and/or activities to be conducted while sitting in the seat 10, for example.

The rear and front cushion pans 28, 30 may be movable among a nominal position (shown in FIG. 2), a lowered position (shown in FIG. 3) and a raised position (shown in FIG. 3). In the nominal position, the rear cushion pan 28 may be a first distance D1 from the frame 20, and the ends 38, 52 of the rear and front cushion pans 28, 30, respectively, may be generally level with each other. In the lowered position, the rear cushion pan 28 may be a second distance D2 from the frame 20 that may be less than the first distance D1; and the upward-facing surfaces 48, 58 of the rear and front cushion pans 28, 30, respectively, may define a first angle A1 therebetween that may be greater than one-hundred-eighty degrees. In the raised position, the rear cushion pan 28 may be a third distance D3 from the frame 20 that may be greater than the first distance D1; and the upward-facing surfaces 48, 58 of the rear and front cushion pans 28, 30, respectively, may define a second angle A2 therebetween that may be less than one-hundred-eighty degrees. In this manner, the seat bottom 12 is simultaneously able to tilt and change its profile shape among the lowered, nominal and raised positions.

The user may adjust the position and profile shape of the rear and front cushion pans 28, 30 among the lowered, nominal and raised positions by moving the adjustment linkage 32. As described above, the user may move the adjustment linkage 32 by actuating a switch connected to a motor driving the drive axle 66 or by manually moving a lever connected to the drive axle 66 to cause rotation of the drive axle 66 relative to the front mounting structure 24.

Rotation of the drive axle 66 in a counterclockwise direction (when viewed from the frame of reference shown in FIGS. 2-4) causes rotation of the drive links 68 in the counterclockwise direction, which causes the front links 70 to move downward and the rear links 72 to simultaneously move upward. Downward movement of the front links 70 causes the rear cushion pan 28 to rotate relative to the rear mounting structure 26 about the first pivot 44 in a counterclockwise direction, thereby causing the forward end 38 of the rear cushion pan 28 to move downward toward the lowered position, as shown in FIG. 3. Upward movement of the rear links 72 causes the front cushion pan 30 to rotate counterclockwise relative to the rear cushion pan 28 about the second pivot 62, as shown in FIG. 3.

Rotation of the drive axle 66 in a clockwise direction (when viewed from the frame of reference shown in FIGS. 2-4) causes rotation of the drive links 68 in the clockwise direction, which causes the front links 70 to move upward and the rear links 72 to simultaneously move downward. Upward movement of the front links 70 causes the rear cushion pan 28 to rotate relative to the rear mounting structure 26 about the first pivot 44 in a clockwise direction, thereby causing the forward end 38 of the rear cushion pan 28 to move upward toward the raised position, as shown in FIG. 4. Downward movement of the rear links 72 causes the front cushion pan 30 to rotate clockwise relative to the rear cushion pan 28 about the second pivot 62, as shown in FIG. 4.

A user with shorter legs might prefer the seat bottom 12 to be positioned in the lowered position (FIG. 3), while a user with longer legs might prefer the seat bottom 12 to be positioned in the raised position (FIG. 4). When the seat bottom 12 is in the lowered position, the front cushion pan 30 may provide adequate lower thigh support for a user with shorter legs, while still allowing the user to plant his or her feet comfortably on the floor of the vehicle and/or on the gas or brake pedals, for example. When the seat bottom 12 is in the raised position, a user with longer legs may plant his or her feet on the floor and/or pedals of the vehicle, and still have his or her lower thighs adequately supported by the front cushion pan 30. It will be appreciated, however, that a user of any size or leg-length may find any position of the rear and front cushion pans 28, 30 the most comfortable depending on the user's personal preferences.

What is claimed is:

1. A seat assembly comprising:
   a seatback extending generally upright; and
   a seat bottom connected to the seatback and including a frame and a seat bottom adjustment mechanism having a rear cushion pan and a front cushion pan that are movable relative to the frame and movable relative to each other between first and second configurations, the rear and front cushion pans supporting one or more seat cushions,
   wherein the rear cushion pan includes an aft end that is pivotably connected to the frame at a first pivot that extends through the rear cushion pan, and wherein the rear and front cushion pans are rotatable relative to each other and relative to the frame without moving the first pivot in a vertical direction relative to the frame,
   wherein movement of the seat bottom mechanism rotates the rear and front cushion pans relative to each other such that a front end of the front cushion pan rotates downward about a second pivot relative to the rear cushion pan and the frame when a front end of the rear cushion pan rotates downward about the first pivot relative to the frame, and the front end of the front cushion pan rotates upward about the second pivot relative to the rear cushion pan and the frame when the front end of the rear cushion pan rotates upward about the first pivot relative to the frame,
   wherein the second pivot defines a rotational axis that is fixed relative to the rear cushion pan.

2. The seat assembly of claim 1, wherein the front end of the rear cushion pan is disposed at a first vertical distance from the frame in the first configuration and a second vertical distance from the frame in the second configuration, the second vertical distance being greater than the first vertical distance.

3. The seat assembly of claim 2, wherein upward-facing edges of the rear and front cushion pans cooperate to define a first angle therebetween in the first configuration and a second angle therebetween in the second configuration.

4. The seat assembly of claim 3, wherein the first angle is greater than one-hundred-eighty degrees, and the second angle is less than one-hundred-eighty degrees.

5. The seat assembly of claim 2, wherein the rear cushion pan corresponds to a rear portion of the seat bottom that is adjacent the seatback.

6. The seat assembly of claim 5, wherein the front cushion pan corresponds to a front portion of the seat bottom that is spaced apart from the seatback.

7. The seat assembly of claim 1, wherein the rear and front cushion pans simultaneously move relative to each other and relative to the frame.

8. The seat assembly of claim 1, wherein the seat bottom adjustment mechanism includes a first link pivotably mounted to the frame, a second link pivotably mounted to the first link and the first cushion pan, and a third link pivotably mounted to the first link and the second cushion pan.

9. The seat assembly of claim 1, wherein the rear and front cushion pans are pivotably connected to each other at the second pivot, and wherein the second pivot includes a rotational axis that is fixed relative to the rear cushion pan and extends through the rear and front cushion pans, the front cushion pan pivots about the rotational axis relative to the first cushion pan when the rear cushion pan pivots relative to the frame.

10. A seat assembly comprising:
    a seatback extending generally upright; and
    a seat bottom connected to the seatback and including a frame and a seat bottom adjustment mechanism having a cushion pan assembly that is tiltable relative to the frame between first and second positions, the cushion pan assembly having a first profile shape in the first position and a second profile shape in the second position, the cushion pan assembly includes rear and front cushion pans, the rear cushion pan is disposed between the front cushion pan and the seatback, the rear cushion pan includes an aft end that is pivotably connected to the frame at a first pivot that extends through the rear cushion pan and a forward end that is disposed at a first vertical distance from the frame in the first position and a second vertical distance from the frame in the second position, the second vertical distance being greater than the first vertical distance,
    wherein the rear and front cushion pans are rotatable relative to each other and relative to the frame between the first and second positions without moving the first pivot of the aft end of the rear cushion pan in a vertical direction relative to the frame,
    wherein the rear and front cushion pans are pivotably connected to each other at a second pivot having a first rotational axis that is fixed relative to the rear cushion pan,
    wherein the seat bottom adjustment mechanism includes first, second and third links, the first link is mounted to the frame at a third pivot having a second rotational axis that fixed relative to the frame, the second link is pivotably coupled to the first link and pivotably coupled to the rear cushion pan at a forward location, the third link pivotably coupled to the first link and pivotably coupled to the front cushion pan at an aft location, the aft location disposed between the first and second pivots, the second pivot disposed between the aft location and the forward location, wherein the rear and front cushion pans move relative to each other such that a front end of the front cushion pan rotates downward about the second pivot when a front end of the rear cushion pan rotates downward about the first pivot, and the front end of the front cushion pan rotates upward about the second pivot when the front end of the rear cushion pan rotates upward about the first pivot.

11. The seat assembly of claim 10, wherein upward-facing edges of the rear and front cushion pans cooperate to define a first angle therebetween in the first position and a second angle therebetween in the second position.

12. The seat assembly of claim 11, wherein the first angle is greater than one-hundred-eighty degrees, and the second angle is less than one-hundred-eighty degrees.

13. The seat assembly of claim 10, wherein the rear and front cushion pans simultaneously move relative to each other and relative to the frame.

14. A seat assembly comprising:
a seatback extending generally upright; and
a seat bottom connected to the seatback and including a frame and a seat bottom adjustment mechanism having rear and front cushion pans that are movable relative to the frame and movable relative to each other between first and second configurations, the rear and front cushion pans supporting one or more seat cushions,
wherein the rear cushion pan includes an aft end that is pivotably connected to the frame at a first pivot that extends through the rear cushion pan, and wherein the rear and front cushion pans are rotatable relative to each other and relative to the frame without moving the first pivot in a vertical direction relative to the frame;
wherein the rear and front cushion pans are pivotably connected to each other at a second pivot having a rotational axis that is fixed relative to the rear cushion pan;
wherein the seat bottom adjustment mechanism includes first, second and third links, the first link is mounted to the frame at a third pivot having a second rotational axis that is fixed relative to the frame, the second link is pivotably coupled to the first link and is pivotably coupled to the rear cushion pan at a forward location, the third link is pivotably coupled to the first link and is pivotably coupled to the second cushion pan at an aft location, the aft location disposed forward of the first pivot and rearward of the second pivot, the second pivot disposed forward of the aft location and rearward of the forward location,
wherein the rear and front cushion pans move relative to each other such that a front end of the front cushion pan rotates downward about the second pivot when a front end of the rear cushion pan rotates downward about the first pivot, and the front end of the front cushion pan rotates upward about the second pivot when the front end of the rear cushion pan rotates upward about the first pivot.

15. The seat assembly of claim 14, wherein the front end of the rear cushion pan is disposed at a first vertical distance from the frame in the first configuration and a second vertical distance from the frame in the second configuration, the second vertical distance being greater than the first vertical distance.

16. The seat assembly of claim 15, wherein upward-facing edges of the rear and front cushion pans cooperate to define a first angle therebetween in the first configuration and a second angle therebetween in the second configuration.

17. The seat assembly of claim 16, wherein the first angle is greater than one-hundred-eighty degrees, and the second angle is less than one-hundred-eighty degrees.

18. The seat assembly of claim 15, wherein the rear cushion pan corresponds to a rear portion of the seat bottom that is adjacent to the seatback and the front cushion pan corresponds to a front portion of the seat bottom that is spaced apart from the seatback.

19. The seat assembly of claim 14, wherein the aft location is disposed forward of the first pivot and rearward of the third pivot.

20. The seat assembly of claim 14, wherein the rear and front cushion pans simultaneously move relative to each other and relative to the frame.

* * * * *